(12) United States Patent
Meid et al.

(10) Patent No.: US 11,713,806 B2
(45) Date of Patent: Aug. 1, 2023

(54) HYDRAULIC ASSEMBLY FOR A VEHICLE TRANSMISSION

(71) Applicant: DEERE & COMPANY, Moline, IL (US)

(72) Inventors: Michael Meid, Waghaeusel (DE); Manuel Billich, Dischingen (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/660,638

(22) Filed: Apr. 26, 2022

(65) Prior Publication Data

US 2022/0381336 A1    Dec. 1, 2022

(30) Foreign Application Priority Data

May 25, 2021  (DE) .......................... 102021113466.8

(51) Int. Cl.
| | | |
|---|---|---|
| *F16H 61/00* | (2006.01) | |
| *F15B 13/02* | (2006.01) | |
| *F15B 1/04* | (2006.01) | |
| *F16H 61/30* | (2006.01) | |
| *F15B 1/02* | (2006.01) | |
| *F15B 1/027* | (2006.01) | |

(52) U.S. Cl.
CPC ......... *F16H 61/0025* (2013.01); *F15B 1/024* (2013.01); *F15B 1/027* (2013.01); *F15B 1/04* (2013.01); *F15B 13/02* (2013.01); *F16H 61/30* (2013.01); *F15B 13/027* (2013.01); *F16H 2061/0034* (2013.01); *F16H 2061/305* (2013.01)

(58) Field of Classification Search
CPC .. F15B 1/024; F15B 1/027; F15B 1/04; F15B 13/027; F16H 61/0025; F16H 2061/0034
See application file for complete search history.

(56) References Cited

U.S. PATENT DOCUMENTS

| | | | |
|---|---|---|---|
| 9,097,336 B2 * | 8/2015 | Block | ................. F16H 61/0025 |
| 2013/0118854 A1 | 5/2013 | Eber | |
| 2013/0284289 A1 * | 10/2013 | Block | ................. F16H 61/0025 |
| | | | 137/544 |
| 2014/0161641 A1 * | 6/2014 | Pekarsky | ............ F16H 61/0021 |
| | | | 417/313 |
| 2014/0283915 A1 * | 9/2014 | Ma | ........................ E02F 9/2292 |
| | | | 137/1 |
| 2015/0089934 A1 * | 4/2015 | Richards | ................. F15B 1/027 |
| | | | 60/393 |

(Continued)

FOREIGN PATENT DOCUMENTS

| | | |
|---|---|---|
| DE | 102014003083 A1 | 9/2015 |
| DE | 102019003415 A1 | 11/2020 |

OTHER PUBLICATIONS

European Search Report issued in application No. 22171705.1, dated Oct. 18, 2022, 8 pages.

*Primary Examiner* — Thomas E Lazo

(57) ABSTRACT

A hydraulic assembly for a vehicle transmission includes a hydraulic pump for providing a system pressure within a hydraulic circuit, a pressure accumulator for temporarily supplying pressure to the hydraulic circuit, and a valve assembly for charging the pressure accumulator after a predetermined pressure threshold value of the system pressure has been reached or exceeded. The valve assembly is hydraulically connected between the pump and the pressure accumulator.

15 Claims, 2 Drawing Sheets

(56) References Cited

U.S. PATENT DOCUMENTS

2016/0047397 A1 2/2016 Sikorski et al.
2016/0281745 A1 9/2016 Shang et al.
2019/0031195 A1 1/2019 Mayhew et al.

* cited by examiner

HYDRAULIC ASSEMBLY FOR A VEHICLE TRANSMISSION

CROSS-REFERENCE TO RELATED APPLICATIONS

This application claims priority to German Patent Application No. 102021113466.8, filed May 25, 2021, which is hereby incorporated by reference in its entirety.

FIELD OF THE DISCLOSURE

The present disclosure relates to a hydraulic assembly for a vehicle transmission.

BACKGROUND

Hydraulic systems are utilized to operate clutches in vehicle transmissions. Hydraulic systems include a hydraulic pump for providing hydraulic fluid to the clutches. Some hydraulic systems include an accumulator in the hydraulic circuit. DE 102019003415 A1 includes a hydraulic arrangement for a vehicle transmission with a hydraulic pump for providing a working pressure within a hydraulic circuit and a pressure accumulator for temporarily supplying pressure to the hydraulic circuit.

SUMMARY

One of the objects underlying the present disclosure is to further improve the hydraulic stability of a vehicle transmission. This object is achieved by a hydraulic assembly having the features of one or more of the following embodiments.

According to an aspect of the present disclosure, the hydraulic assembly for a vehicle transmission has at least one hydraulic pump (e.g., a transmission oil pump) for providing a hydraulic system pressure within a hydraulic circuit, for example in order to actuate one or more clutches within the vehicle transmission. The hydraulic pump thereby conveys a hydraulic medium (e.g., oil) within the hydraulic circuit. The hydraulic assembly additionally contains a hydraulic pressure accumulator or pressure reservoir for temporarily supplying pressure to the hydraulic circuit. The pressure accumulator allows the hydraulic circuit to be temporarily supplied with pressure and assisted. The pressure accumulator, as a kind of buffer, can thereby temporarily provide the necessary pressure for the hydraulic circuit if the pump is unable to deliver a sufficient system pressure, for example in the case of high, short-term or fluctuating volume flow demands. This is the case, for example, during a clutch actuation or while the engine is stopped. Between the pump and the pressure accumulator there is hydraulically connected a valve assembly. The valve assembly is configured such that it effects charging of the pressure accumulator as soon as, with increasing system pressure, a predetermined pressure threshold value of the system pressure is reached or exceeded.

According to an aspect of the present disclosure, the valve assembly allows the pressure accumulator to be hydraulically charged when the hydraulic circuit has reached, by means of the pump, a stabilizing system pressure, namely the predetermined pressure threshold value. Periods of time in which the system pressure in the hydraulic circuit is undesirably low can thereby advantageously be shortened and the functionality of the hydraulic circuit, or of the vehicle transmission, can be further stabilized.

According to an aspect of the present disclosure, purposive charging of the pressure accumulator at a relatively low system pressure is consequently avoided. This advantageously results in a higher pressure-rise gradient in the hydraulic circuit. Overall, the valve assembly permits improved hydraulic stability of the hydraulic circuit, or of the vehicle transmission, over different operating states. The stable system pressure above all also optimizes the clutch control (inter alia clutch actuation, clutch modulation, clutch closure) of the vehicle transmission.

According to an aspect of the present disclosure, the predetermined pressure threshold value first permits pressure stabilization of the hydraulic circuit, before the pressure accumulator is hydraulically charged. The pressure accumulator can thereby purposively be fast-charged via the valve assembly. At the same time, during the purposive charging operation, a substantial pressure drop in the hydraulic circuit can be avoided. Fast charging is advantageously assisted by the excess volume flow in the hydraulic circuit.

According to an aspect of the present disclosure, the pressure threshold value can be dimensioned differently depending on the form of the hydraulic circuit, or of the vehicle transmission. For example, the pressure threshold value has a value of approximately from 90% to 95% of the control pressure of the hydraulic circuit, or of the vehicle transmission.

Further advantageous embodiments of the hydraulic assembly according to the disclosure are apparent from the following.

According to an aspect of the present disclosure, the above-described properties of the charging function of the valve assembly are achieved in that the valve assembly has a charging valve unit, which acts as a blockable hydraulic connection between the pump and the pressure accumulator. The hydraulic connection is thereby blocked when the system pressure is below the predetermined pressure threshold value. Starting from an increasing system pressure, the blocking is removed when, or after, the predetermined pressure threshold value has been reached or exceeded. This facilitates a compact construction of the charging valve unit and thus also of the valve assembly as a whole.

According to an aspect of the present disclosure, for its action as a blockable hydraulic connection between the pump and the pressure accumulator, the charging valve unit is controlled in a technically suitable manner. In some embodiments, the charging valve unit is configured and hydraulically connected such that, for the hydraulic blocking and the removal thereof, it is controlled by the system pressure. A technically precise functionality of the charging valve unit is thereby facilitated.

According to an aspect of the present disclosure, the pressure threshold value of the system pressure is predetermined in that a compression spring, which acts against the system pressure, of the charging valve unit is correspondingly dimensioned in respect of its compressive force. This permits a simple construction of the charging valve unit (e.g., in the manner of a pressure-limiting valve) with at the same time a technically precise mode of operation.

According to an aspect of the present disclosure, the valve assembly has a discharging valve unit with a flow direction for temporarily supplying pressure to the hydraulic circuit. Both a charging function and a discharging function of the pressure accumulator are thereby integrated in the valve assembly. This facilitates a hydraulically simple construction of the hydraulic assembly for example in a commercial vehicle.

According to an aspect of the present disclosure, the discharging valve unit has a spring-loaded blocking valve (e.g., a check valve), in order to implement the discharging function in a technically simple manner. The blocking direction of the blocking valve thereby runs from the pump to the pressure accumulator.

According to an aspect of the present disclosure, the discharging valve unit and the charging valve unit are connected hydraulically in parallel, whereby a compact construction of the valve assembly is facilitated.

According to an aspect of the present disclosure, the valve assembly contains an equalization orifice, which is hydraulically connected between the pump and the pressure accumulator. Pressure equalization between the hydraulic circuit and the pressure accumulator is thereby ensured. By corresponding dimensioning of the equalization orifice, pressure equalization can take place so slowly that the functioning of the hydraulic circuit and also of the discharging valve unit or of the charging valve unit is not impaired.

According to an aspect of the present disclosure, the effective direction of the above-mentioned compression spring of the charging valve unit and the effective direction of the above-mentioned compression spring of the blocking valve are oriented parallel (in opposite directions or in the same direction) to one another. This facilitates a space-saving construction of the valve assembly.

According to an aspect of the present disclosure, the two above-mentioned compression springs are positioned in a coaxial relative arrangement, whereby the valve assembly can be of comparatively simple form in respect of its structural-geometric construction and is correspondingly less expensive to produce.

The above and other features will become apparent from the following detailed description and accompanying drawings.

BRIEF DESCRIPTION OF THE DRAWINGS

The hydraulic assembly according to the disclosure will be explained in greater detail hereinbelow with reference to the accompanying drawings. In the drawings, components that correspond or are comparable in terms of their function are identified with the same reference numerals. In the drawings.

DETAILED DESCRIPTION

The embodiments disclosed in the above drawings and the following detailed description are not intended to be exhaustive or to limit the present disclosure to these embodiments.

Figure 1:
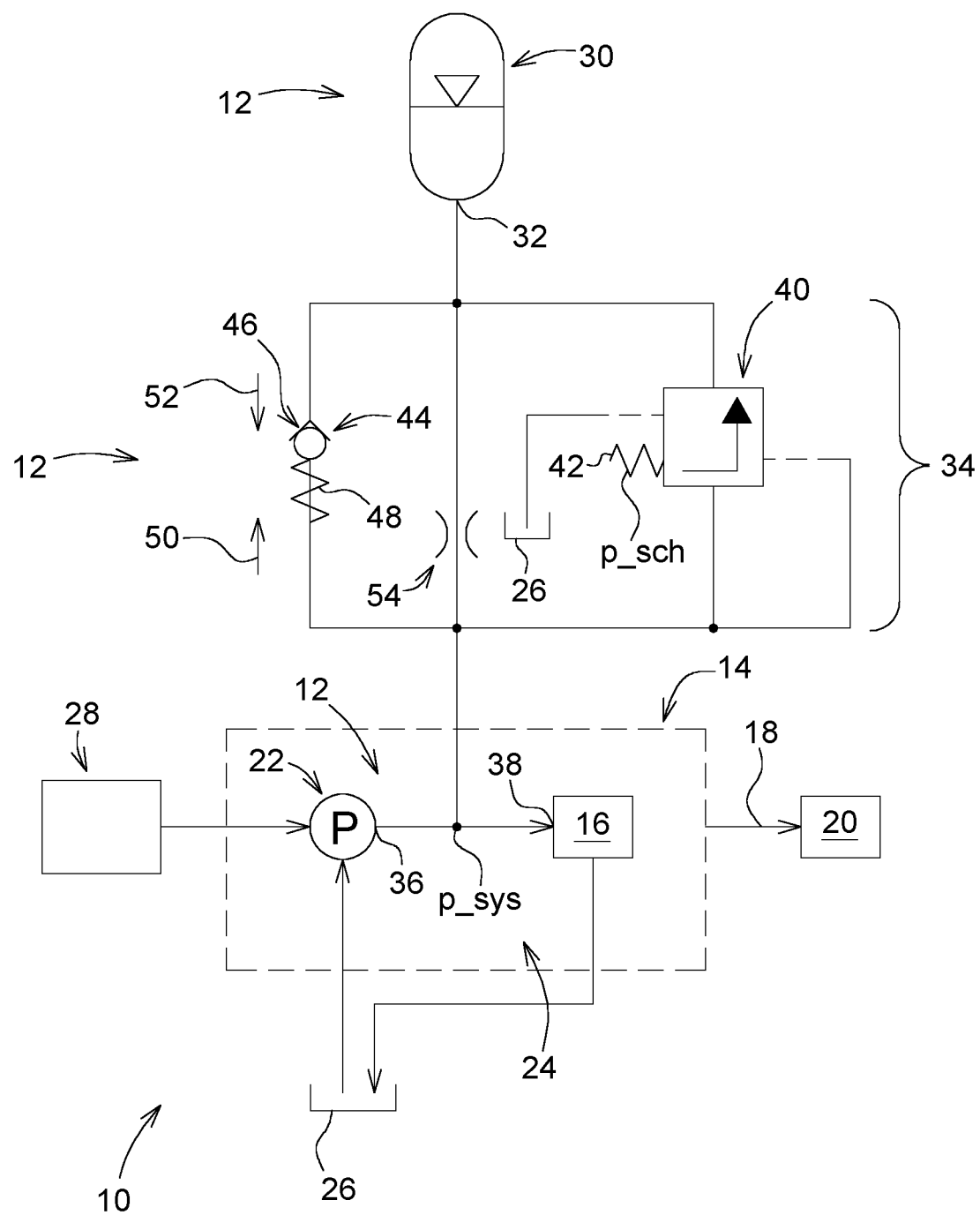
FIG. 1 is a schematic illustration, in the manner of a block diagram, of components of a commercial vehicle having a hydraulic assembly according to the disclosure containing a valve assembly.

FIG. 1 shows, schematically, components of an agricultural commercial vehicle 10, for example a tractor. A hydraulic assembly 12 is arranged in part inside and in part outside a transmission unit 14 for the commercial vehicle 10. The transmission unit 14 contains at least one hydraulically controlled clutch 16. The transmission unit 14 is connected in the conventional manner via a transmission output shaft 18 to an axle drive 20 of the commercial vehicle 10.

The hydraulic assembly 12 has a hydraulic pump 22, which provides a system pressure $p\_sys$ for controlling the clutch 16. The pump 22 is a transmission oil pump arranged in the transmission unit 14. The hydraulic assembly 12 contains a hydraulic circuit 24, which is closed via an oil reservoir or sump 26. The pump 22 is driven by a drive motor 28 of the commercial vehicle 10. The drive motor 28 is, for example, an internal combustion engine of the commercial vehicle 10 or an electric motor which can be supplied with power, for example, by a battery of the commercial vehicle 10.

A further component of the hydraulic assembly 12 is a hydraulic pressure reservoir or pressure accumulator 30. This serves to temporarily supply pressure to the hydraulic circuit 24, in order to assist and/or temporarily replace the function of the pump 22, for example if the pump exhibits a pressure drop (e.g., in the case of clutch actuation) or is inactive (e.g., because the drive motor 28 is stopped).

The pressure accumulator 30 is hydraulically connected by a hydraulic connection 32 to a valve assembly 34. The valve assembly 34 is hydraulically interposed between the pressure accumulator 30 and the pump 22.

Under normal operating conditions, a control pressure purge is present as the system pressure $p\_sys$ at a pump output 36 of the pump 22 and at a hydraulic input 38 of the clutch 16, which pressure can have a value of, for example, from 16 to 24 bar depending on the design of the transmission unit 14.

The valve assembly 34 contains a charging valve unit 40, which starts charging of the pressure accumulator 30 if, with increasing system pressure $p\_sys$, a predetermined pressure threshold $p\_sch$ is reached or exceeded. For this purpose, the charging valve unit 40 is configured as a blockable hydraulic connection between the pump 22 and the pressure accumulator 30. The charging valve unit 40 can be configured in the manner of a pressure-limiting valve. The charging valve unit 40 is controlled by the system pressure $p\_sys$. The spring pressure of a valve compression spring 42 works against the system pressure $p\_sys$ at the charging valve unit 40.

The valve compression spring 42 is dimensioned such that its spring pressure corresponds to the desired pressure threshold value $p\_sch$. The pressure threshold value $p\_sch$ is thereby predetermined. In the region of the charging valve unit 40, the hydraulic connection between the pump 22 and the pressure accumulator 30 remains blocked when the system pressure $p\_sys$ is below the pressure threshold value $p\_sch$. As soon as the increasing system pressure $p\_sys$ reaches or exceeds the pressure threshold value $p\_sch$, the blocking action of the charging valve unit 40 is automatically removed and fast charging of the pressure accumulator 30 takes place via the charging valve unit 40.

The valve assembly 34 further has a discharging valve unit 44 in the form of a check valve 46. A compression spring 48 of the check valve 46 acts such that the blocking direction 50 thereof runs from the pump 22 to the pressure accumulator 30. Consequently, when there is sufficient system pressure $p\_sys$, no discharging of the pressure accumulator 30 takes place. Conversely, a flow direction 52 of the check valve 46 ensures the desired temporary supply of pressure to the hydraulic circuit 24 by the pressure accumulator 30.

As can be seen in FIG. 1, the discharging valve unit 44 and the charging valve unit 40 are connected hydraulically in parallel within the valve assembly 34. The valve assembly 34 additionally contains a hydraulic equalization orifice 54 between the pump 22 and the pressure accumulator 30. This equalization orifice 54 ensures pressure equalization between the hydraulic circuit 24 and the pressure accumulator 30. The pressure equalization takes place, by corresponding dimensioning of the equalization orifice 54, so slowly that the functioning of the hydraulic circuit 24 and also of the discharging valve unit 44 or of the charging valve unit 40 is not impaired.

Figure 2:
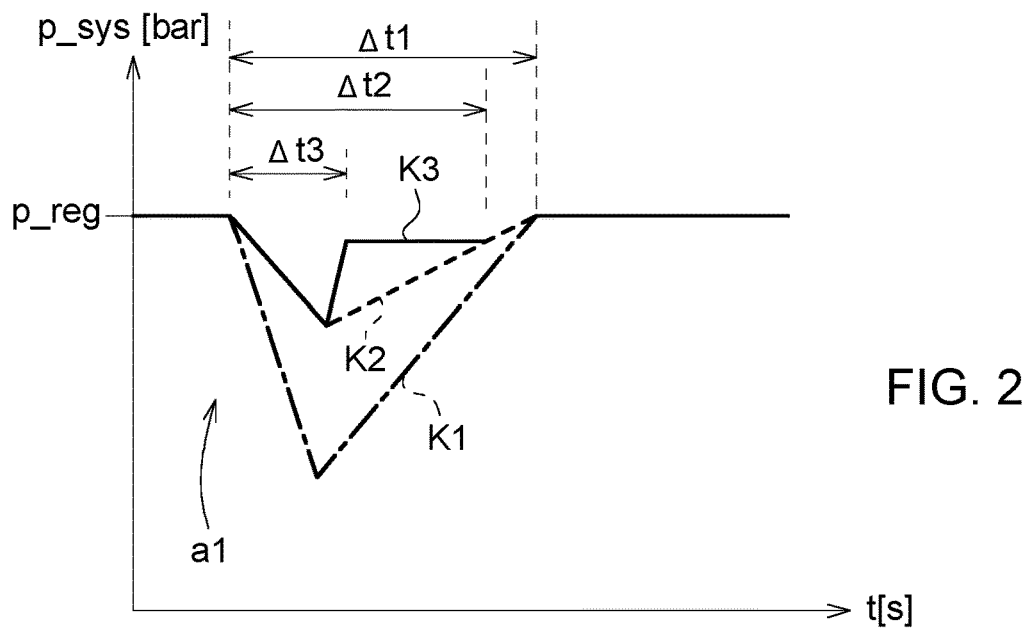
FIG. 2 is a diagram with characteristic curves for characterizing a clutch actuation.

The valve assembly 34 according to FIG. 1 has a hydraulic stabilizing action on the transmission unit 14, or on the hydraulic circuit 24, in the case of different operating states. This can be seen in FIG. 2 by means of a comparative consideration of different characteristic curves K1, K2, K3 in the case of a clutch actuation a1. The characteristic curve K1 illustrated by a dot-and-dash line represents a hydraulic assembly 12 without a pressure accumulator 30. The characteristic curve K2 illustrated by a broken line represents a hydraulic assembly 12 with a pressure accumulator 30 but without a valve assembly 34. The characteristic curve K3 represents a hydraulic assembly 12 with a pressure accumulator 30 and a valve assembly 34.

Temporally before the clutch actuation a1, the hydraulic circuits of all three above-mentioned embodiments of the hydraulic assembly 12 have the same control pressure p_reg. The control pressure p_reg can have a value of, for example, from 16 to 24 bar depending on the transmission used.

During the clutch actuation a1, the system pressure p_sys falls sharply in the case of the hydraulic assembly 12 without a pressure accumulator 30 (characteristic curve K1). This sharp pressure drop can be reduced by the use of the pressure accumulator 30 (characteristic curves K2, K3). However, the period of time, or length of time, Δt2 until the control pressure p_reg is approximately reached again in the case of the hydraulic assembly 12 according to characteristic curve K2 is slightly shorter than in the case of the hydraulic assembly 12 according to characteristic curve K1 (length of time Δt1). The use of the valve assembly 34 significantly shortens the length of time until the control pressure p_reg is approximately reached again (length of time Δt3).

Figure 3:
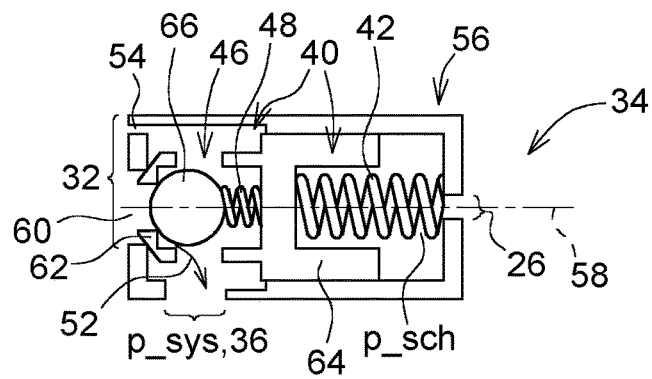
FIG. 3 shows the valve assembly according to FIG. 1 in a first embodiment.
Figure 4:
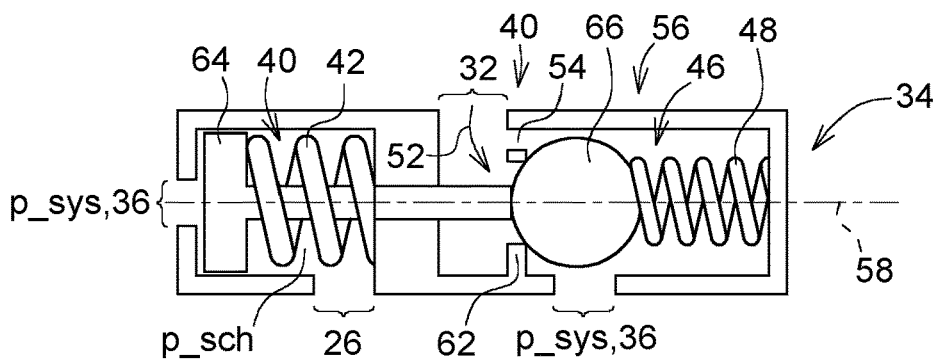
FIG. 4 shows the valve assembly according to FIG. 1 in a further embodiment.
Figure 5:
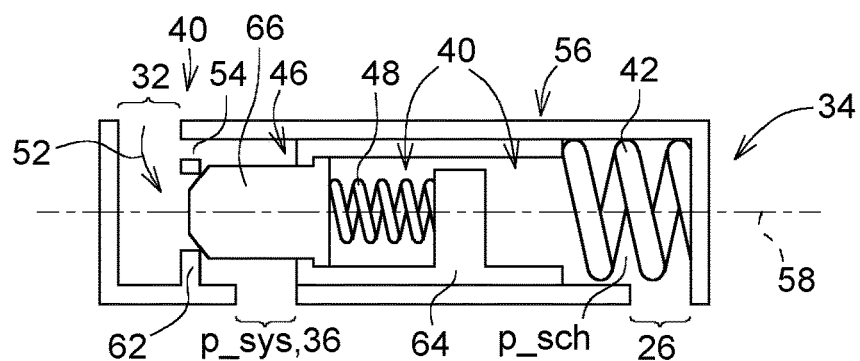
FIG. 5 shows the valve assembly according to FIG. 1 in a further embodiment.

The valve assembly 34 can be implemented by means of multiple separate valves and corresponding valve housings or by means of a single housing 56 with valve functions integrated therein. The variant with the single housing 56 permits a compact construction of the valve assembly 34. FIG. 3, FIG. 4, and FIG. 5 show different embodiments of such a compact construction of the valve assembly 34. In some embodiments, the housing 56 is of cylindrical form. Depending on the desired volume flow rate (e.g., in liters per minute), the housing 56 can have an axial length of, for example, approximately from 5 cm to 10 cm.

According to FIG. 3, the housing 56 of the valve assembly 34 has a longitudinal center axis 58. The hydraulic connection 32 of the pressure accumulator 30 is permanently hydraulically connected to the pump output 36 via the equalization orifice 54. The main connection between the hydraulic connection 32 and the pump output 36 is, however, hydraulically blocked at a system pressure p_sys below the predetermined pressure threshold value p_sch. For this purpose, an axial opening 60 of the housing 56 is sealed by a valve seat 62, lying thereon, of the check valve 46. Since the valve seat 62 is fixedly connected to a slide 64 to which pressure is applied by the valve compression spring 42, the axial opening 60 remains closed until the system pressure p_sys overcomes the spring force of the valve compression spring 42, that is to say the predetermined pressure threshold value p_sch. The axial opening 60 is then opened and the pressure accumulator 30 is fast-charged via the hydraulic path 36-32. If the system pressure p_sys falls below the pressure threshold value p_sch, the axial opening 60 is automatically closed again by the valve seat 62. If the system pressure p_sys falls further, the pressure accumulator 30 can automatically be discharged in the flow direction 52 in order to assist the hydraulic circuit 24, since no appreciable compressive force has to be applied against the compression spring 48 of the check valve 46. The compression spring 48 is dimensioned such that it is ensured that a blocking element 66, which is spherical, for example, occupies a defined position on the valve seat 62.

FIG. 4 shows a further embodiment of the housing 56. Here, the valve seat 62 of the check valve 46 is part of the housing 56. As soon as an increasing system pressure p_sys overcomes the predetermined pressure threshold value (valve compression spring 42), the slide 64 is pushed in the direction towards the blocking element 66 (which here again is spherical, for example) and pushes it away from the valve seat 62. As a result, the pressure accumulator 30 can be fast-charged by the system pressure p_sys via the hydraulic path in the region of the valve seat 62. If the system pressure p_sys falls below the pressure threshold value p_sch, the slide 64 is pushed back into its starting position again by the spring pressure of the valve compression spring 42. The blocking element 66 can thus automatically occupy its blocking position at the valve seat 62 again. If the system pressure p_sys falls further, the pressure accumulator 30 can be automatically discharged in the flow direction 52 in order to assist the hydraulic circuit 24, since no appreciable compressive force has to be applied against the compression spring 48 of the check valve 46. The compression spring 48 is dimensioned merely such that the blocking element 66 occupies a defined position on the valve seat 62.

FIG. 5 shows a further embodiment of the housing 56. Here, the valve seat 62 of the check valve 46 is again part of the housing 56. As soon as an increasing system pressure p_sys overcomes the predetermined pressure threshold value (valve compression spring 42), the slide 64, together with the blocking element 66 (which here is approximately peg-shaped), is pushed axially away from the valve seat 62. As a result, the pressure accumulator 30 can be fast-charged by the system pressure p_sys via the hydraulic path in the region of the valve seat 62. If the system pressure p_sys falls below the pressure threshold value p_sch, the slide 64 is pushed back into its starting position again by the spring pressure of the valve compression spring 42. The blocking element 66 can thus automatically occupy its blocking position on the valve seat 62 again. If the system pressure p_sys falls further, the pressure accumulator 30 can automatically be discharged in the flow direction 52 in order to assist the hydraulic circuit 24, since no appreciable compressive force has to be applied against the compression spring 48 of the check valve 46. The compression spring 48 is dimensioned such that it is ensured that the blocking element 66 occupies a defined position on the valve seat 62.

In the illustrated embodiments of the valve assembly 34, the valve compression spring 42 and the compression spring 48 are arranged inside the housing 56 coaxially with one another and coaxially with the longitudinal center axis 58. The effective directions of the valve compression spring 42 and of the compression spring 48 run in parallel. A space-saving construction of the housing 56 and an efficient functionality of the valve assembly 34 are thereby facilitated.

The equalization orifice 54 can be arranged at different positions, for example on the housing 56 and/or on the slide 64. Alternatively or in addition, the function of the equalization orifice 54 can also be realized in that the valve seat 62 has a groove as a defined defect in tightness.

For the sake of completeness, it should be mentioned that details illustrated schematically in the drawings are not necessarily to scale and individual details are also not necessarily to scale in relation to one another. The chosen illustration of the components also serves primarily to explain the function of the hydraulic assembly 12, the actual configuration of which may vary.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments of the present disclosure, these descriptions should not be viewed in a restrictive or limiting sense. Rather, there are several variations and modifications which may be made without departing from the scope of the appended claims.

What is claimed is:

1. A hydraulic assembly for a vehicle transmission, comprising:
    a hydraulic pump for providing a system pressure within a hydraulic circuit;
    a pressure accumulator for temporarily supplying pressure to the hydraulic circuit; and
    a valve assembly for charging the pressure accumulator after a predetermined pressure threshold value of the system pressure has been reached or exceeded, the valve assembly hydraulically connected between the pump and the pressure accumulator;
    wherein the valve assembly includes a charging valve unit which acts as a blockable hydraulic connection between the pump and the pressure accumulator, the hydraulic connection is blocked when the system pressure is below the predetermined pressure threshold value, the blocking is removed after the predetermined pressure threshold value has been reached or exceeded, and the pressure threshold value of the system pressure is predetermined by a compression spring of the charging valve unit that acts against the system pressure;
    wherein the valve assembly includes a discharging valve unit with a flow direction for temporarily supplying pressure to the hydraulic circuit, and the discharging valve unit includes a blocking valve having a compression spring with a blocking direction which runs from the pump to the pressure accumulator; and
    wherein the valve assembly includes a hydraulic equalization orifice between the pump and the pressure accumulator.

2. The hydraulic assembly as claimed in claim 1, wherein the charging valve unit is controllable by the system pressure for blocking the hydraulic connection between the pump and the pressure accumulator and for removing this blocking.

3. The hydraulic assembly of claim 1, wherein the discharging valve unit and the charging valve unit are connected hydraulically in parallel.

4. The hydraulic assembly of claim 1, wherein the effective directions of the compression spring of the charging valve unit and of the compression spring of the blocking valve run in parallel.

5. The hydraulic assembly of claim 1, wherein the compression spring of the charging valve unit and the compression spring of the blocking valve are arranged coaxially.

6. The hydraulic assembly of claim 1, wherein the discharging valve unit, the charging valve unit, and the hydraulic equalization orifice are connected hydraulically in parallel.

7. A commercial vehicle having hydraulic assembly for a transmission, comprising:
    a hydraulic pump for providing a system pressure within a hydraulic circuit;
    a pressure accumulator for temporarily supplying pressure to the hydraulic circuit; and
    a valve assembly for charging the pressure accumulator after a predetermined pressure threshold value of the system pressure has been reached or exceeded, the valve assembly hydraulically connected between the pump and the pressure accumulator;
    wherein the valve assembly includes a charging valve unit which acts as a blockable hydraulic connection between the pump and the pressure accumulator, the hydraulic connection is blocked when the system pressure is below the predetermined pressure threshold value, the blocking is removed after the predetermined pressure threshold value has been reached or exceeded, and the pressure threshold value of the system pressure is predetermined by a compression spring of the charging valve unit that acts against the system pressure;
    wherein the valve assembly includes a discharging valve unit with a flow direction for temporarily supplying pressure to the hydraulic circuit, and the discharging valve unit includes a blocking valve having a compression spring with a blocking direction which runs from the pump to the pressure accumulator; and
    wherein the valve assembly includes a hydraulic equalization orifice between the pump and the pressure accumulator.

8. The commercial vehicle as claimed in claim 7, wherein the charging valve unit is controllable by the system pressure for blocking the hydraulic connection between the pump and the pressure accumulator and for removing this blocking.

9. The commercial vehicle of claim 7, wherein the discharging valve unit and the charging valve unit are connected hydraulically in parallel.

10. The commercial vehicle of claim 7, wherein the effective directions of the compression spring of the charging valve unit and of the compression spring of the blocking valve run in parallel.

11. The commercial vehicle of claim 7, wherein the compression spring of the charging valve unit and the compression spring of the blocking valve are arranged coaxially.

12. The commercial vehicle of claim 7, wherein the discharging valve unit, the charging valve unit, and the hydraulic equalization orifice are connected hydraulically in parallel.

13. A hydraulic assembly for a vehicle transmission, comprising:
- a hydraulic pump for providing a system pressure within a hydraulic circuit;
- a pressure accumulator for temporarily supplying pressure to the hydraulic circuit; and
- a valve assembly for charging the pressure accumulator after a predetermined pressure threshold value of the system pressure has been reached or exceeded, the valve assembly hydraulically connected between the pump and the pressure accumulator;
- wherein the valve assembly includes a charging valve unit which acts as a blockable hydraulic connection between the pump and the pressure accumulator, the hydraulic connection is blocked when the system pressure is below the predetermined pressure threshold value, the blocking is removed after the predetermined pressure threshold value has been reached or exceeded, and the pressure threshold value of the system pressure is predetermined by a compression spring of the charging valve unit that acts against the system pressure;
- wherein the valve assembly includes a discharging valve unit with a flow direction for temporarily supplying pressure to the hydraulic circuit, and the discharging valve unit includes a blocking valve having a compression spring with a blocking direction which runs from the pump to the pressure accumulator; and
- wherein the compression spring of the charging valve unit and the compression spring of the blocking valve are arranged coaxially.

14. The hydraulic assembly as claimed in claim 13, wherein the charging valve unit is controllable by the system pressure for blocking the hydraulic connection between the pump and the pressure accumulator and for removing this blocking.

15. The hydraulic assembly of claim 13, wherein the discharging valve unit and the charging valve unit are connected hydraulically in parallel.

\* \* \* \* \*